Patented Sept. 13, 1938

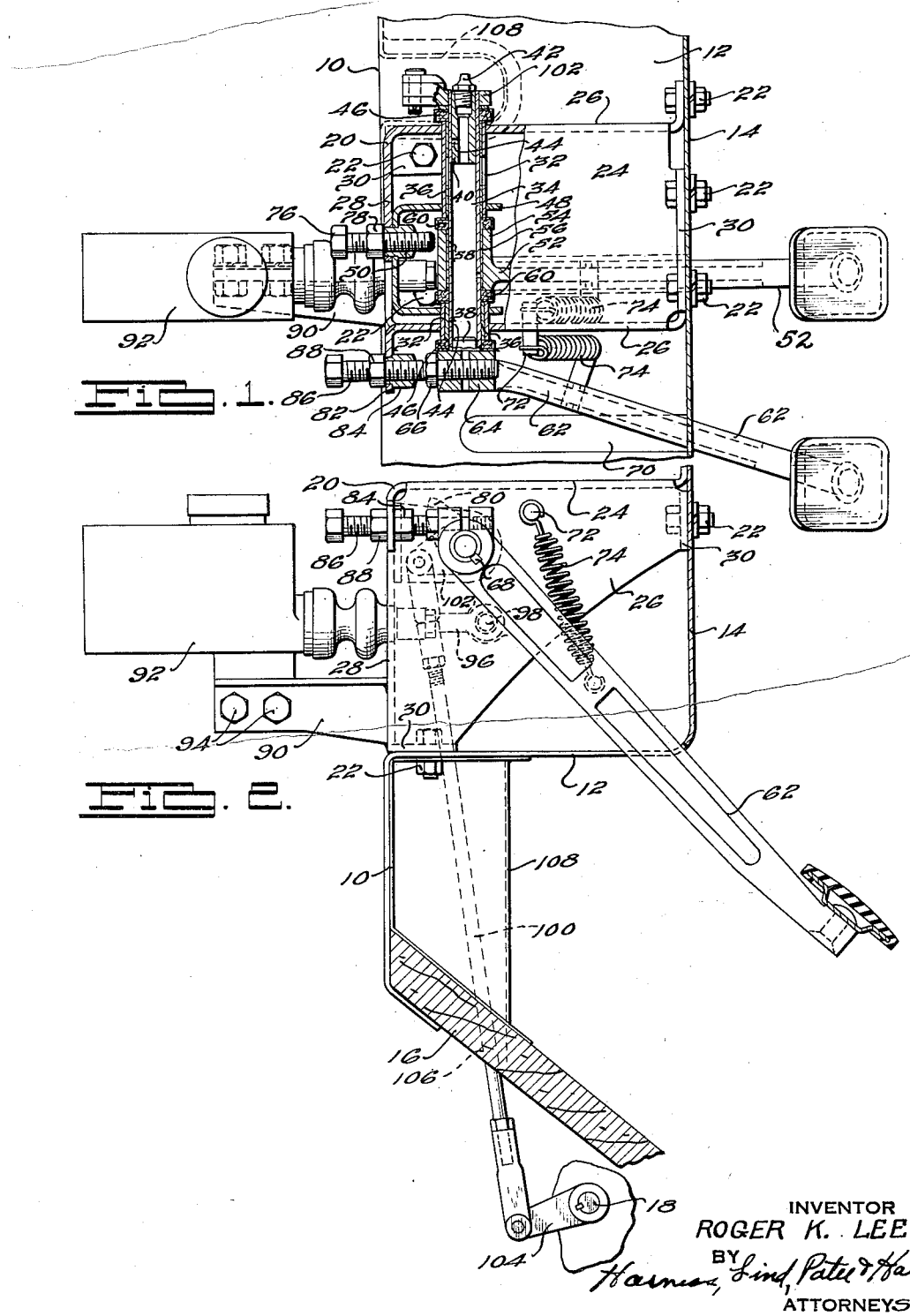

2,129,851

UNITED STATES PATENT OFFICE 2,129,851

AUTOMOBILE CONTROL MECHANISM

Roger K. Lee, Highland Park, Mich., assignor to Chrysler Corporation, Highland Park, Mich., a corporation of Delaware Application November 27, 1936, Serial No. 112,870

5 Claims. (Cl. 180—77)

This invention relates to an automobile control mechanism including clutch and brake operating mechanism.

An object of the invention is to provide a unitary assembly of the controls which may be readily assembled or disassembled on the dash of an automobile.

Another object of the invention is to pivotally support the brake and clutch pedals of the control mechanism on the dash at a point above the floor boards with the pedals extending inwardly and downwardly substantially parallel to the floor boards to provide a clear space on the floor boards for occupants of the vehicle.

Another object of the invention is to provide a boxlike bracket which together with the dash upon which it is mounted forms a substantially closed supporting structure for the controls.

A further object of the invention is to provide an inexpensive structure which may be practically completely assembled separate from the automobile and then secured to the automobile as an assembled unit complete in itself except for the connecting links which run from the controls to their respective mechanisms on the vehicle.

Other objects and advantages of the invention will be more fully understood from the following description taken in connection with the accompanying drawing in which:

Fig. 1 is a horizontal sectional view through the dash of an automobile showing a preferred embodiment of my invention, parts of the mechanism being broken away and in section to more clearly illustrate each part and its location; and Fig. 2 is a vertical sectional view through the dash and floor boards of an automobile illustrating the mechanism shown in Fig. 1; the controls being shown in side elevation.

Referring to the drawing, the automobile dash is illustrated at 10 and extends generally in a vertical direction except for a depressed portion which provides a horizontal shelf 12 and a vertically extending portion 14. The lower edge of the dash 10 forms a support for the upper and forward end of floor boards 16. Beneath the floor boards 16 I have illustrated the clutch operating cross shaft 18 which may be of the conventional design and adapted upon angular movement to engage or disengage the clutch in the usual manner.

At the juncture of the horizontally extending portion 12 and vertically extending portion 14 of the dash 10, I have provided a bracket 20 which is detachably secured to the dash by bolts and nuts 22. The bracket 20 is formed from sheet metal and is substantially a box structure having a top wall 24, spaced side walls 26 and a back wall 28, the bottom and front walls being omitted except for flanges 30 which serve as means for attaching the bolts and nuts 22. The bottom and front of the bracket are substantially closed by the portions 12 and 14 of the dash 10 when the bracket is assembled.

In each of spaced side walls 26 are journal bearings 32 which pivotally support a hollow shaft 34. The journals are provided with liners 36 which are preferably formed of bearing material. The opposite ends of the hollow shaft 34 are provided with plugs 38 and 40, the plug 38 being closed and the plug 40 being drilled and tapped to receive a lubricating nipple 42 through which lubricant is supplied to the hollow shaft and from there through openings 44 in the side wall of the shaft 34 to the bearing material 36. The outer ends of the journals 32 are sealed with the hollow shaft 34 by packing members 46, the hollow shaft having its opposite ends each projecting beyond the side walls 26 and the packing members 46.

To form an additional support for the journals 32 a U-shaped stamping 48 has been secured to the back wall 28 by means of a hollow rivet 50 which is threaded to receive a stop.

Pivotally supported on the hollow shaft 34 and between the two legs of the U-shaped stamping 48 I have arranged a brake pedal 52 which in its normal position extends inwardly and downwardly through the horizontal flange 12 of the dash 10. The hub 54 of the brake pedal 52 is provided with a liner 56 of bearing material and an opening 58 is provided in the wall of the hollow shaft 34 to supply lubricant from the hollow shaft 34 to the liner 56. Packing members 60 are provided between the ends of the journals 32 and the opposite ends of the hub 54 to form a seal around the hollow shaft 34.

A clutch pedal 62 is provided with a split hub 64 which is clamped on one end of the holow shaft 34 by means of a nut 66 screw threaded to one portion of the split hub. The hub may be keyed to the shaft as shown at 68. A slot 70 is formed in the horizontally extending flange 12 of the dash 10 to receive the clutch pedal 62 and the pedal in its normal position extends in an inward and downward direction substantially parallel to the brake pedal 52. A pin 72 is secured in the side wall 26 of the bracket 20 extending inwardly and outwardly of the bracket 20 and one end each of coil springs 74 are supported on the respective ends of the pin 72. The opposite ends of the coil springs 74 are each secured to the brake pedal 52 and clutch pedal 62 respectively holding the pedals under tension in their normal position.

An adjustable stop for the brake pedal 52 comprises a bolt 76 screw threaded into the rivet 50 and a lock nut 78. A projection 80 is formed on with the inner end of the bolt 76.

A flange 82 is struck out from the back wall 28 and is provided with a screw threaded member the hub 54 of the brake pedal 52 for engagement ber 84 which is riveted to the flange 82. This member 84 receives a bolt 86 upon which is a lock nut 88. The inner end of the bolt 86 engages the bolt 66 to provide an adjustable stop for the normal position of the clutch pedal 62.

A bracket 90 is secured preferably by welding to the back wall 28 and extends rearwardly therefrom. A hydraulic brake cylinder 92 is supported on this bracket by bolts 94. A piston rod 96 forms an operating connection between a piston, not shown, within the brake cylinder 92 and the brake pedal 52, the rod 96 being pivotally secured thereto as at 98.

A connecting link 100 is provided between an arm 102 on the clutch pedal shaft 34 and an arm 104 on the clutch operating cross shaft 18. The arm 102 is located at the end of the shaft 34 opposite to the end receiving the clutch pedal 62 and is external of the side wall 26 of the bracket 20. An opening 106 is provided in the floor board 16 through which the rod 100 extends. A stamping 108 forms a housing for the rod 100.

While I have described and illustrated one embodiment of my invention it will be understood that various changes including the size, shape and arrangement of parts may be made without departing from the spirit of my invention and it is not my intention to limit its scope other than by the terms of the appended claims.

I claim:

1. Automobile control mechanism comprising a boxlike bracket having a back wall and side walls, a shaft journaled in the side walls of said bracket, a brake pedal journaled on said shaft between the side walls of said bracket, a clutch pedal fixed to said shaft at one end thereof, a clutch connecting link secured to the opposite end of said shaft, a hydraulic brake cylinder secured to the back wall of said bracket, a connection between said brake cylinder and said brake pedal, adjustable stops for said pedals carried by the said back wall, and means for detachably securing said bracket to a support.

2. Automobile control mechanism comprising a boxlike bracket having a back wall and two spaced side walls adapted to be detachably secured to an automobile dash, a brake pedal journaled within the side walls of said bracket, a hydraulic brake cylinder secured externally of said bracket, a connection between said cylinder and said brake pedal, a shaft journaled in said side walls and extending through said brake pedal, a clutch pedal secured to one end of said shaft externally of said bracket, and a connecting link secured to the other end of said shaft externally of said bracket adapted to be connected to the clutch operating mechanism.

3. In combination, an automobile dash having an inwardly extending portion forming a shelf externally of said dash, a boxlike bracket detachably secured to said dash shelf, and brake and clutch pedals pivotally supported on said bracket extending downwardly and inwardly through said dash shelf.

4. In combination, an automobile dash having a shelf on its outer surface, and a boxlike bracket detachably secured to said dash shelf, said bracket forming the sole support for, a brake pedal, a clutch pedal and a hydraulic brake cylinder operatively connected to said brake pedal.

5. In combination, an automobile dash having a horizontally extending portion and a vertically extending portion; and an automobile control mechanism detachably secured on said horizontally and vertically extending portions including a bracket, a shaft journaled in said bracket, a brake pedal pivotally supported on said shaft, and a clutch pedal secured to said shaft.

ROGER K. LEE.

CERTIFICATE OF CORRECTION.

Patent No. 2,129,851.  September 13, 1938.

ROGER K. LEE.

It is hereby certified that error appears in the printed specification of the above numbered patent requiring correction as follows: Page 2, first column, line 12, strike out the words "the hub 54 of the brake pedal 52 for engagement" and insert the same after "on" in line 8; and that the said Letters Patent should be read with this correction therein that the same may conform to the record of the case in the Patent Office.

Signed and sealed this 22nd day of November, A. D. 1938.

Henry Van Arsdale (Seal)  Acting Commissioner of Patents.